(12) United States Patent
Marko et al.

(10) Patent No.: US 12,327,408 B2
(45) Date of Patent: Jun. 10, 2025

(54) INTERACTIVE VIDEO SYSTEM FOR SPORTS MEDIA

(71) Applicant: STATS LLC, Chicago, IL (US)

(72) Inventors: Christian Marko, Graz (AT); Zsolt Biro, Graz (AT); Karl Ferk, Graz (AT)

(73) Assignee: STATS LLC, Chicago, IL (US)

( * ) Notice: Subject to any disclaimer, the term of this patent is extended or adjusted under 35 U.S.C. 154(b) by 580 days.

(21) Appl. No.: 17/651,955

(22) Filed: Feb. 22, 2022

(65) Prior Publication Data
US 2022/0270368 A1 Aug. 25, 2022

Related U.S. Application Data

(60) Provisional application No. 63/164,929, filed on Mar. 23, 2021, provisional application No. 63/152,094, filed on Feb. 22, 2021.

(51) Int. Cl.
*G06V 20/40* (2022.01)
*G06V 20/70* (2022.01)

(52) U.S. Cl.
CPC ............ *G06V 20/42* (2022.01); *G06V 20/44* (2022.01); *G06V 20/70* (2022.01)

(58) Field of Classification Search
CPC ......... G06V 20/42; G06V 20/44; G06V 20/70
See application file for complete search history.

(56) References Cited

U.S. PATENT DOCUMENTS

| 2007/0072679 | A1 | 3/2007 | Kerns et al. | |
| 2011/0169959 | A1* | 7/2011 | DeAngelis | G06V 20/42 |
| | | | | 348/157 |
| 2016/0365121 | A1* | 12/2016 | DeCaprio | H04N 9/8205 |
| 2017/0238055 | A1* | 8/2017 | Chang | G06V 20/42 |
| | | | | 725/19 |
| 2019/0222776 | A1* | 7/2019 | Carter | H04N 5/272 |

(Continued)

FOREIGN PATENT DOCUMENTS

CA  3037201 A1 *  3/2018  ........... G06F 16/783

OTHER PUBLICATIONS

PCT International Application No. PCT/US22/17232, International Search Report and Written Opinion of the International Searching Authority, dated Jul. 5, 2022, 10 pages.

*Primary Examiner* — Carol W Chan
(74) *Attorney, Agent, or Firm* — Bookoff McAndrews, PLLC

(57) ABSTRACT

A method for delivering interactive video to a user is disclosed herein. A computing system identifies video contents corresponding to a sporting event. The video contents include a plurality of video frames. The computing system annotates each video frame of the plurality of video frames to uniquely identify the video frame and contents contained therein. The computing system receives, from a plurality of prediction models, a plurality of data inputs related to agents and actions captured in each video frame of the plurality of video frames. The computing system generates a plurality of data frames based on the plurality of data inputs. The computing system associates each data frame with a respective video frame using the annotations. The computing system causes a user device to present the interactive video to the user by instructing the user device to merge the plurality of data frames with the plurality of video frames.

18 Claims, 11 Drawing Sheets

(56) References Cited

U.S. PATENT DOCUMENTS

2019/0332865 A1   10/2019   Dassa et al.
2019/0354765 A1*  11/2019   Chan .................. H04N 21/2187
2020/0074181 A1    3/2020   Chang et al.
2021/0065452 A1*   3/2021   Gazioglu ................ G06T 11/60

* cited by examiner

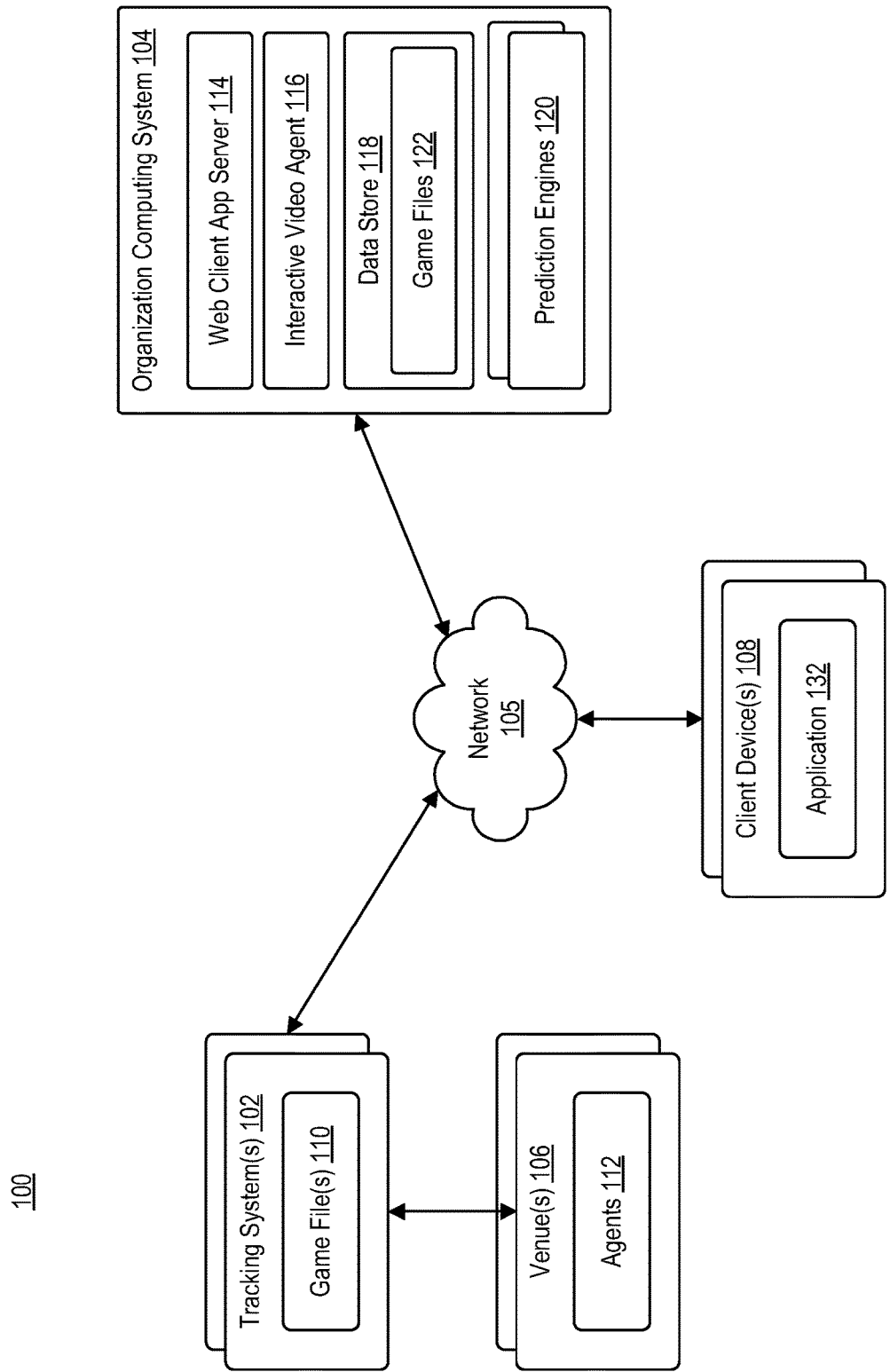

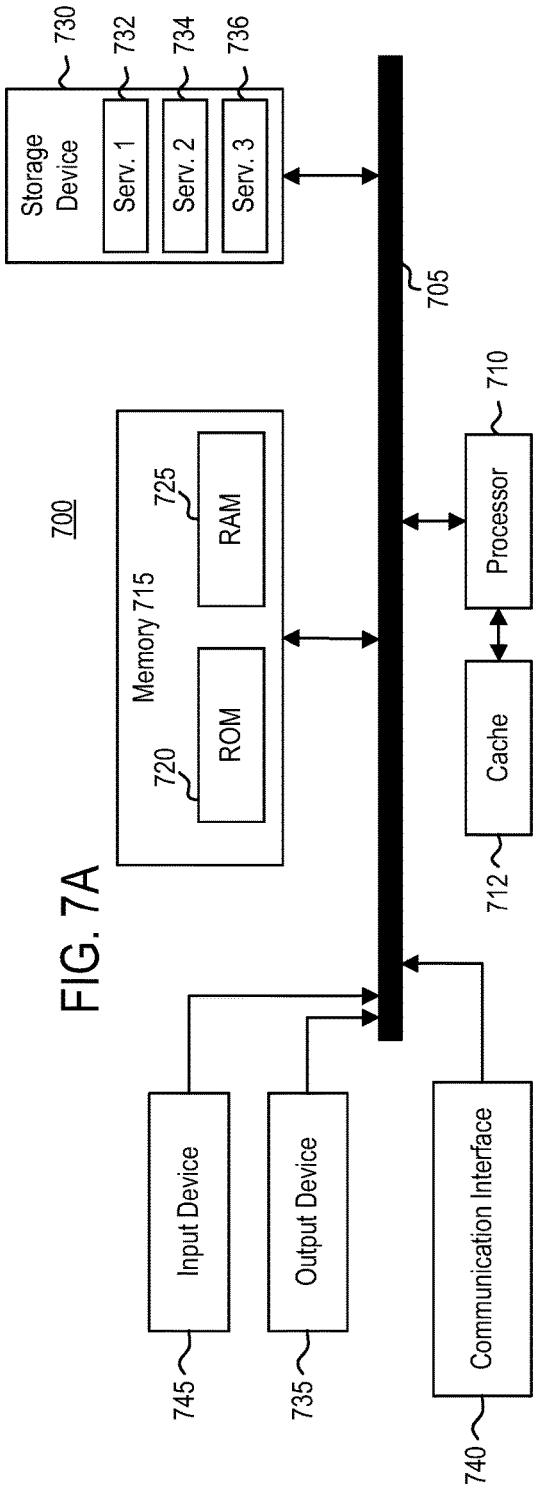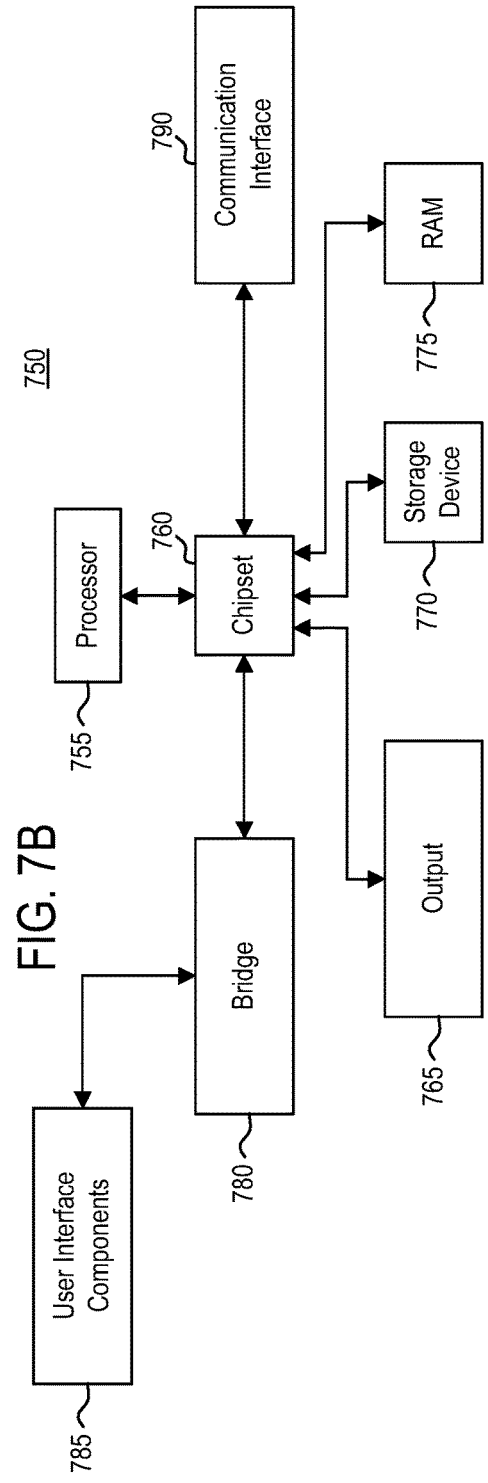

INTERACTIVE VIDEO SYSTEM FOR SPORTS MEDIA

CROSS-REFERENCE TO RELATED APPLICATIONS

This application claims priority to U.S. Application Ser. No. 63/152,094, filed Feb. 22, 2021, and U.S. Application Ser. No. 63/164,929, filed Mar. 23, 2021, which are both hereby incorporated by reference in their entireties.

FIELD OF THE DISCLOSURE

The present disclosure generally relates to an interactive video system for sports media and a method for operating the same.

BACKGROUND

Increasingly, sports fans and data analysts have become entrenched in sports analytics. Most of the analysis performed by sports fans and data analysts typically come after the game has ended in the form of articles, talk shows, radio shows, and the like.

SUMMARY

In some embodiments, a method for delivering interactive video to a user is disclosed herein. A computing system identifies video contents corresponding to a sporting event. The video contents include a plurality of video frames. The computing system annotates each video frame of the plurality of video frames to uniquely identify the video frame and contents contained therein. The computing system receives, from a plurality of prediction models, a plurality of data inputs related to agents and actions captured in each video frame of the plurality of video frames. The computing system generates a plurality of data frames based on the plurality of data inputs. Each data frame is uniquely associated with a respective video frame. The computing system associates each data frame with a respective video frame using the annotations. The computing system causes a user device to present the interactive video to the user by instructing the user device to merge the plurality of data frames with the plurality of video frames.

In some embodiments, a system is disclosed herein. The system includes a processor and a memory. The memory has programming instructions stored thereon, which, when executed by the processor, causes the system to perform one or more operations. The one or more operations include identifying video contents corresponding to a sporting event. The video contents include a plurality of video frames. The one or more operations further include annotating each video frame of the plurality of video frames to uniquely identify the video frame and contents contained therein. The one or more operations further include receiving, from a plurality of prediction models, a plurality of data inputs related to agents and actions captured in each video frame of the plurality of video frames. The one or more operations further include generating a plurality of data frames based on the plurality of data inputs. Each data frame is uniquely associated with a respective video frame. The one or more operations further include associating each data frame with a respective video frame using the annotations. The one or more operations further include causing a user device to present an interactive video to the user by instructing the user device to merge the plurality of data frames with the plurality of video frames.

In some embodiments, a non-transitory computer readable medium is disclosed herein. The non-transitory computer readable medium includes one or more sequences of instructions, which, when executed by one or more processors, causes a computing system to perform operations. The operations include identifying, by the computing system, video contents corresponding to a sporting event. The video contents include a plurality of video frames. The operations further include annotating, by the computing system, each video frame of the plurality of video frames to uniquely identify the video frame and contents contained therein. The operations further include receiving, by the computing system from a plurality of prediction models, a plurality of data inputs related to agents and actions captured in each video frame of the plurality of video frames. The operations further include generating, by the computing system, a plurality of data frames based on the plurality of data inputs. Each data frame is uniquely associated with a respective video frame. The operations further include associating, by the computing system, each data frame with a respective video frame using the annotations. The operations further include causing, by the computing system, a user device to present an interactive video to the user by instructing the user device to merge the plurality of data frames with the plurality of video frames.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

FIG. 1 is a block diagram illustrating a computing environment, according to example embodiments.

FIG. 7A is a block diagram illustrating a computing device, according to example embodiments.

FIG. 7B is a block diagram illustrating a computing device, according to example embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 2A:
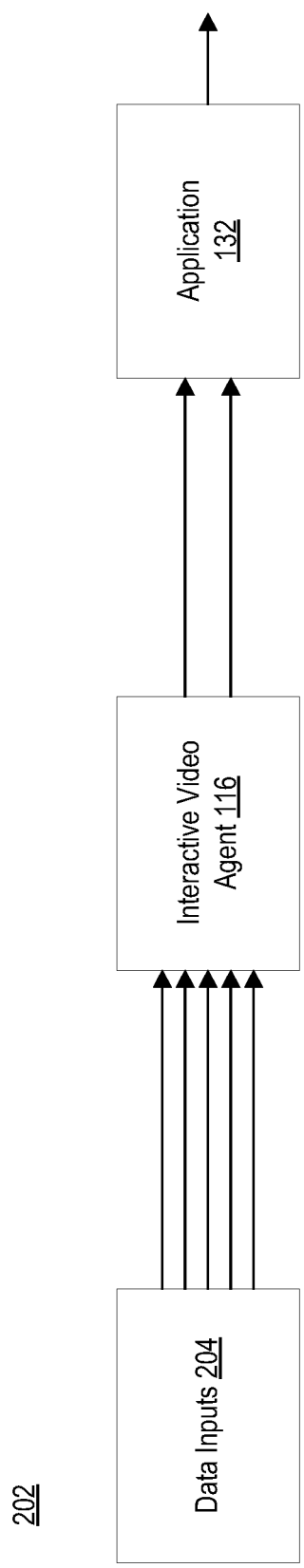
FIG. 2A is a block diagram illustrating a data processing stream, according to example embodiments.

One or more techniques described herein generally relate to a system and method for providing an interactive video to an end user. In some embodiments, one or more techniques described herein may utilize functionality of AutoSTATS technology, commercially available from STATS® Perform. Utilizing the various features of AutoSTATS, one or more techniques described herein may provide video frame level information about players in a current frame presented to the user. In some embodiments, each player in each frame may be associated with various coordinate data, such that when a user may interact with the video, the system may be able to identify a player or players that the user selected. In some embodiments, responsive to receiving a user input selecting a player in a video frame, the system may be configured to identify the selected player and provide overlay information to the user's device for display thereon. In some embodiments, exemplary overlay information may include, but is not limited to, player name, speed of the player, event data, and the like.

FIG. 1 is a block diagram illustrating a computing environment 100, according to example embodiments. Computing environment 100 may include tracking system 102, organization computing system 104, and one or more client devices 108 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of environment 100.

Tracking system 102 may be positioned in a venue 106. For example, venue 106 may be configured to host a sporting event that includes one or more agents 112. Tracking system 102 may be configured to capture the motions of all agents (i.e., players) on the playing surface, as well as one or more other objects of relevance (e.g., ball, referees, etc.). In some embodiments, tracking system 102 may be an optically-based system using, for example, a plurality of fixed cameras. For example, a system of six stationary, calibrated cameras, which project the three-dimensional locations of players and the ball onto a two-dimensional overhead view of the court may be used. In another example, a mix of stationary and non-stationary cameras may be used to capture motions of all agents on the playing surface as well as one or more objects or relevance. As those skilled in the art recognize, utilization of such tracking system (e.g., tracking system 102) may result in many different camera views of the court (e.g., high sideline view, free-throw line view, huddle view, face-off view, end zone view, center line, corner line, throw-in line, penalty spot, etc.). In some embodiments, tracking system 102 may be used for a broadcast feed of a given match. In such embodiments, each frame of the broadcast feed may be stored in a game file 110.

In some embodiments, game file 110 may further be augmented with other event information corresponding to event data, such as, but not limited to, game event information (pass, made shot, turnover, etc.) and context information (current score, time remaining, etc.).

Tracking system 102 may be configured to communicate with organization computing system 104 via network 105. Organization computing system 104 may be configured to manage and analyze the data captured by tracking system 102. Organization computing system 104 may include at least a web client application server 114, interactive video agent 116, a data store 118, and prediction models 120. Each of interactive video agent 116 and prediction models 120 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Data store 118 may be configured to store one or more game files 122. Each game file 122 may include one or more video frames for a given game and data of the corresponding game. For example, the data may correspond to a plurality of positional information for each agent captured by tracking system 102. In some embodiments, the data may correspond to broadcast data of a given match, in which case, the data may correspond to a plurality of positional information for each agent from the broadcast feed of a given match. Generally, such information may be referred to herein as "tracking data." Tracking data may include, but is not limited to, positional information related to the players/ball on the playing surface.

Interactive video agent 116 may be configured to generate a plurality of interactive video frames to be transmitted to a user device (e.g., client device 108). For example, interactive video agent 116 may be configured to process video frames for each game stored in data store 118. To process each video frame for each game, interactive video agent 116 may be configured to tag each video frame for each game. For example, by tagging each video frame for each game, interactive video agent 116 may allow for easier identification of data corresponding to each respective video frame. In some embodiments, tagging of each video frame may take the form of a watermark for each video frame.

In some embodiments, interactive video agent 116 may work in conjunction with prediction models 120 to generate one or more data frames to be merged with the one or more video frames. For example, interactive video agent 116 may be configured to generate one or more data frames that include outputs generated by one or more prediction models 120. In this manner, interactive video agent 116 may be configured to provide a more interactive viewing experience to end users by integrating unique insights generated by prediction models 120 to the end user.

In some embodiments, interactive video agent 116 may further provide advertisers with unique opportunities. For example, interactive video agent 116 may allow an advertiser to submit an online advertisement for inclusion in a broadcast feed or on-demand video of a game. In some embodiments, the inclusion of such advertisement may be handled by a third-party advertisement server that can facilitate a bidding process for an advertisement space within the video.

In some embodiments, interactive video agent 116 may be configured to present content from any tracking source via a viewer. Exemplary tracking sources may include, but are not limited to, in-venue data capture (e.g., SportVu), broadcast data (e.g., AutoSTATS), and the like. In some embodiments, content may be from a live match data source. For example, live data may be delivered to interactive video agent 116 via a websocket streaming data source. In some embodiments, content may be from a post-match data source. For example, post-match data may be delivered to interactive video agent 116 via one or more application programming interfaces (APIs) using lazy loading (i.e., poll batches of data so that the initial load may be quick).

In some embodiments, the viewer may include embedded artificial intelligence metrics, such as those generated by prediction models 120. Exemplary metrics may include, but are not limited to, passing options, xReceiver, xReciever active runs, top receivers, ball pressure, man pressure, and the like. Via the viewer, a use may toggle on and off the various metrics. For example, a user may dynamically activate or deactivate various metrics to create a personalized viewing experience.

In some embodiments, interactive video agent 116 may generate the viewer in such a way that a user may select different camera angles. For example, a user may be able to select between a left view, a right view, a behind the net or goal view, a birds-eye view and the like.

In some embodiments, interactive video agent 116 may generate the viewer in a manner that allows the user to follow the ball camera. For example, interactive video agent 116 may receive content from a camera that automatically follows the ball, similar to a broadcast feed, so that the ball is always in center of interest.

Prediction models 120 may be representative of one or more prediction models utilized by an entity associated with organization computing system 104. For example, prediction models 120 may be representative of one or more prediction models and/or software tools currently available from STATS® Perform, headquartered in Chicago, Illinois. In some embodiments, prediction models 120 may be representative of one or more prediction models associated with AutoSTATS artificial intelligence platform, commercially available from STATS® Perform. In some embodiments, prediction models 120 may be representative of one or more prediction models, such as, but not limited to a receiver model, a playing style model, a live-win prediction model, a transition model, a danger model, a goal-keeper model, and the like.

Generally, each prediction model 120 may be configured to generate unique insights to be incorporated into a data frame by interactive video agent 116. Using an example scenario, a prediction model 120 may generate an output related to a goalkeeper's likelihood of stopping a penalty kick in a soccer match. This output may be provided to interactive video agent 116 such that interactive video agent 116 can generate a data frame that includes at least the goalkeeper's likelihood of stopping the penalty kick and associate the data frame with a particular video frame. In this manner, when the video frame and data frame is provided to the user, the user's device can merge the data frame with the video frames so that the output may be overlaid on the video.

Client device 108 may be in communication with organization computing system 104 via network 105. Client device 108 may be operated by a user. For example, client device 108 may be a mobile device, a tablet, a desktop computer, or any computing system having the capabilities described herein. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 108 may include at least application 132. Application 132 may be representative of a web browser that allows access to a website or a stand-alone application. Client device 108 may access application 132 to access one or more functionalities of organization computing system 104. Client device 108 may communicate over network 105 to request a webpage, for example, from web client application server 114 of organization computing system 104. For example, client device 108 may be configured to execute application 132 to access content managed by web client application server 114. The content that is displayed to client device 108 may be transmitted from web client application server 114 to client device 108, and subsequently processed by application 132 for display through a graphical user interface (GUI) of client device 108.

Generally, a user may utilize application 132 to view a video of a sporting event. In some embodiments, the video is from a sporting event that already occurred. In some embodiments, the video is a live broadcast feed of a sporting event currently occurring. In some embodiments, the video is a delayed broadcast feed of a sporting event that is occurring. In some embodiments, application 132 may retrieve one or more video frames and one or more data frames for the sporting event from organization computing system 104. Each video frame for the sporting event provided by organization computing system 104 to application 132 may be tagged by interactive video agent 116. In this manner, when application 132 processes a specific video frame, the one or more tags associated with the video frame may instruct application 132 to retrieve a corresponding data frame and merge the video frame with the corresponding data frame, such that additional insights may be overlaid onto the video frame when presented to the user.

In some embodiments, rather than view a video of a sporting event, application 132 may be configured to generate a virtual view of the game (e.g., a three-dimensional view of the game).

In some embodiments, application 132 may also support interactive functionality. For example, when a video frame may be presented to an end user via application 132, an end user may select a specific player within the video frame. This may be attributed to interactive video agent 116, which allows end users to interact directly with pixels on the screen. For example, because interactive video agent 116 may be able to sense where players are in an image plane of video data, interactive video agent 116 may allow a user to select a player within the video feed. The selection of a player may allow interactive video agent 116 to overlay certain information over the video frames. The selection of the specific player may instruct application 132 to retrieve certain data about the player, such as, but not limited to, the player's name, current speed, current game statistics, and the like. In some embodiments, such data may further include a different option a player should have taken (e.g., the likelihood of making a pass, the pressure of a defender, the likelihood of scoring a goal in that situation, and the like.). In some embodiments, via application 132, a user may draw directly on the broadcast feed or virtual view of the game. In some embodiments, via application 132, a user may be able to request a play simulation.

In operation, responsive to receiving the user input, application 132 may identify a location within the video frame that corresponds to the user's input. Based on this location information, application 132 may retrieve a corresponding data frame that includes various attributes or data about the current video frame. Application 132 may retrieve the specific data relating to the selected player and overlay this data onto the video frame for the user to view. In some embodiments, application 132 may continue to provide additional insights related to the specified player over subsequent video frames by identifying corresponding data frames and player information.

In this manner, two different users may be able to view the same, live, broadcast feed of the game but be provided with unique viewing experiences. For example, a first user may interact with the broadcast feed of the game in a first manner (e.g., requesting additional information about a player on Team A) and a second user may interact with the same broadcast feed in a second manner (e.g., requesting additional information about a player on Team B).

FIG. 2A is a block diagram illustrating a data processing stream 202, according to example embodiments. Data processing stream 202 may illustrate an exemplary data processing stream for post-match data. For example, data processing stream 202 may be exemplary of an on-demand or post-match viewing of a game.

With respect to data processing stream 202, interactive video agent 116 may be configured to receive various data related to video frames for a certain match. For example, as illustrative, interactive video agent 116 may be configured to receive one or more inputs 204 generated by one or more prediction models 120. As shown, one or more inputs 204 may be representative of match statistics, team or squad data, match event data, player location within the video frame (e.g., (i,j) coordinates), player location on the two-dimensional playing surface (e.g., (x, y) coordinates), player identification information, match events linked to certain video frames, player seasonal statistics, player career statistics, match facts, and live win probability. In some embodiments, one or more inputs 204 may also include video data. For example, as shown, one or more inputs 204 may further include video stream for the event or game. In some embodiments, the video stream may include a plurality of video frames defining the video stream. In some embodiments, one or more inputs 204 may be pulled in via one or more application programming interfaces (APIs) or web socket feeds.

Based on the one or more inputs, interactive video agent 116 may be configured to generate one or more data frames for each video frame. In some embodiments, interactive video agent 116 may tag or mark each video frame, such that a data frame can be mapped or associated with a respective video framed.

Following processing of the one or more data frames and the one or more video frames, interactive video agent 116 may send the one or more data frames and the one or more video frames to application 132 executing on client device 108. Application 132 may be configured to merge the one or more data frames with the one or more video frames to present an interactive video of the game to the end user.

Figure 2B:
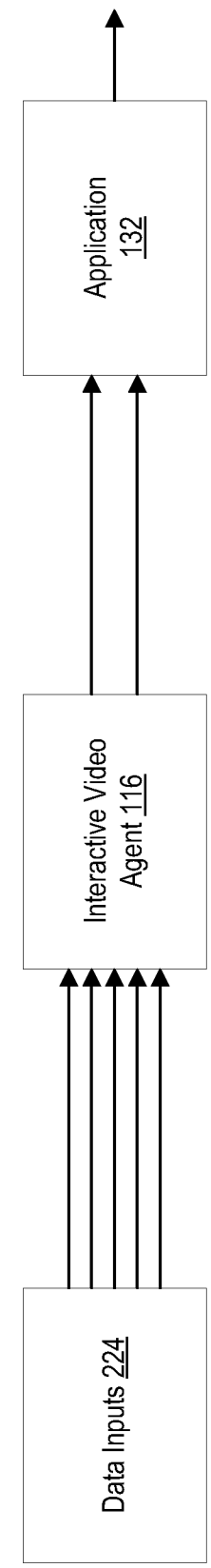
FIG. 2B is a block diagram illustrating a data processing stream, according to example embodiments.

FIG. 2B is a block diagram illustrating a data processing stream 222, according to example embodiments.

Data processing stream 222 may illustrate an exemplary data processing stream for live match data. For example, data processing stream 222 may be exemplary of a live or broadcast viewing of a game.

With respect to data processing stream 222, interactive video agent 116 may be configured to receive various data related to live or nearly-live video frames for a certain match. For example, as illustrative, interactive video agent 116 may be configured to receive one or more inputs 224 generated by one or more prediction models 120. As shown, one or more inputs 224 may be representative of match statistics, team or squad data, match event data, player location within the video frame (e.g., (i, j) coordinates), possession information, player seasonal statistics, player career statistics, and match facts. In some embodiments, one or more inputs 224 may also include video data. For example, as shown, one or more inputs 224 may further include video stream for the event or game. In some embodiments, the video stream may include a plurality of video frames defining the video stream. In some embodiments, one or more inputs 224 may be pulled in via one or more APIs or web socket feeds.

Based on the one or more inputs, interactive video agent 116 may be configured to generate one or more data frames for each video frame. In some embodiments, interactive video agent 116 may tag or mark each video frame, such that a data frame can be mapped or associated with a respective video framed.

Following processing of the one or more data frames and the one or more video frames, interactive video agent 116 may send the one or more data frames and the one or more video frames to application 132 executing on client device 108. In some embodiments, interactive video agent 116 may consume a real time messaging protocol (RTMP) stream for analysis, but encode the RTMP stream into an HTTP live streaming (HLS) protocol, and may maintain the included unique identifier or timestamp. Application 132 may be configured to merge the one or more data frames with the one or more video frames to present an interactive video of the game to the end user.

Figure 3:
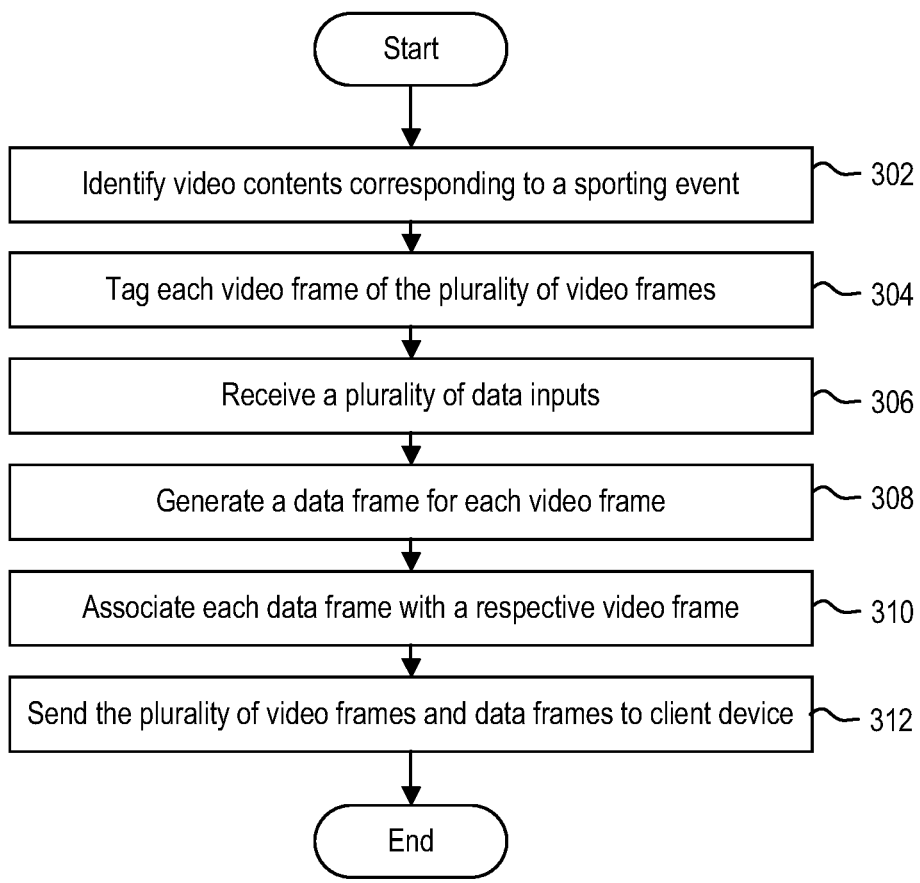
FIG. 3 is a block diagram illustrating graph neural network, according to example embodiments.

FIG. 3 is a flow diagram illustrating a method 300 of delivering an interactive video to an end user, according to example embodiments. Method 300 may begin at step 302.

At step 302, organization computing system 104 may identify video contents corresponding to a sporting event. In some embodiments, video data of a sporting event may be stored in data store 118 via one or more game files 122. In some embodiments, video of each sporting event may include a plurality of video frames.

At step 304, organization computing system 104 may tag each video frame of the plurality of video frames. For example, interactive video agent 116 may be configured to tag or mark each video frame of the plurality of video frames so that a data frame may be associated with a respective video frame.

At step 306, organization computing system 104 may receive a plurality of data inputs. In some embodiments, interactive video agent 116 may receive a plurality of data inputs from one or more prediction models 120. In some embodiments, interactive video agent 116 may retrieve a plurality of data inputs for a target game or event from a corresponding game file 122 in data store 118. In some embodiments, the plurality of data inputs may include, but is not limited to, one or more of match statistics, team or squad data, match event data, player location within the video frame (e.g., (i,j) coordinates), player location on the two-dimensional playing surface (e.g., (x, y) coordinates), player identification information, match events linked to certain video frames, player seasonal statistics, player career statistics, match facts, and live win probability.

At step 308, organization computing system 104 may generate a data frame for each video frame. In some embodiments, interactive video agent 116 may generate a data frame based on the plurality of data inputs. Generally, each data frame may include at least information regarding the players on the playing surface, the location of the players on the playing surface, the ball or puck, and the like. In some embodiments, each data frame may include additional insights such as current win probability, current speed of a player, a likelihood of scoring, and the like.

At step 310, organization computing system 104 may associate each data frame with a respective video frame. For example, interactive video agent 116 may associate or map each data frame to a respective video frame using the tagging and/or marking information generated for each video frame.

At step 312, organization computing system 104 may send the plurality of video frames and the plurality of data frames to client device 108. For example, interactive video agent 116 may transmit the plurality of video frames and the plurality of data frames to application 132 executing on client device 108. Application 132 may be configured to merge the plurality of data frames with the plurality of video frames for presentation to the user.

Figure 4:
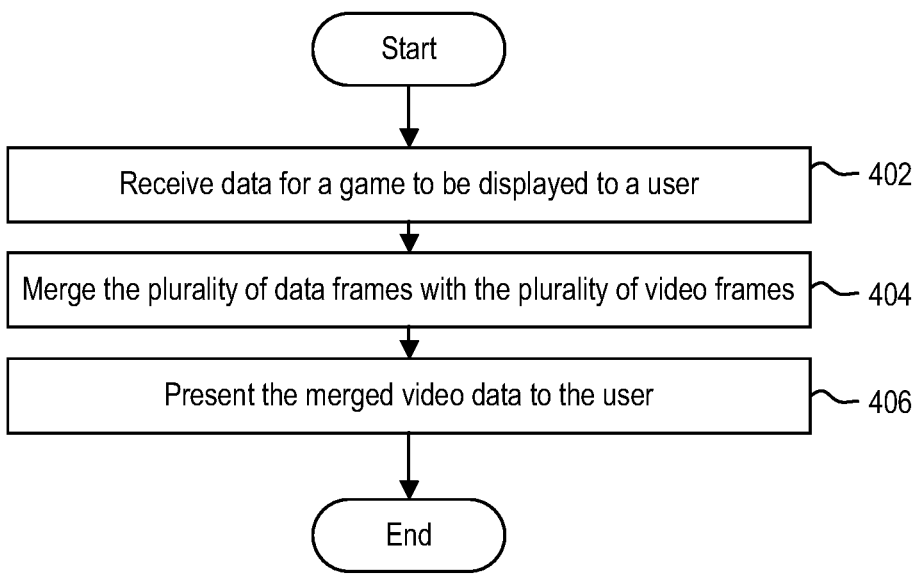
FIG. 4 is a block diagram illustrating exemplary architecture of spatial dynamic graph generation network, according to example embodiments.

FIG. 4 is a flow diagram illustrating a method 400 of presenting an interactive video to a user, according to exemplary embodiments. Method 400 may begin at step 402.

At step 402, client device 108 may receive data for a game to be displayed to a user. For example, application 132 may receive, from interactive video agent 116, a plurality of video frames and a plurality of data frames corresponding to a respective game or match. As previously discussed, each video frame of the plurality of video frames may include a tag or mark that allows interactive video agent 116 to identify a corresponding data frame when needed.

At step 404, client device 108 may merge the plurality of data frames with the plurality of video frames. For example, application 132 may parse each video frame to determine a tag or identifier associated therewith. Based on the tag or identifier, application 132 may retrieve a corresponding data frame and merge the data frame with the video frame. In this manner, information contained in the data frame may be overlaid onto the video frame.

At step 406, client device 108 may present the merged video data to the user. For example, application 132 may render a graphical user interface that includes an interactive video as a result of merging a data frame with a respective video frame.

Figure 5A:
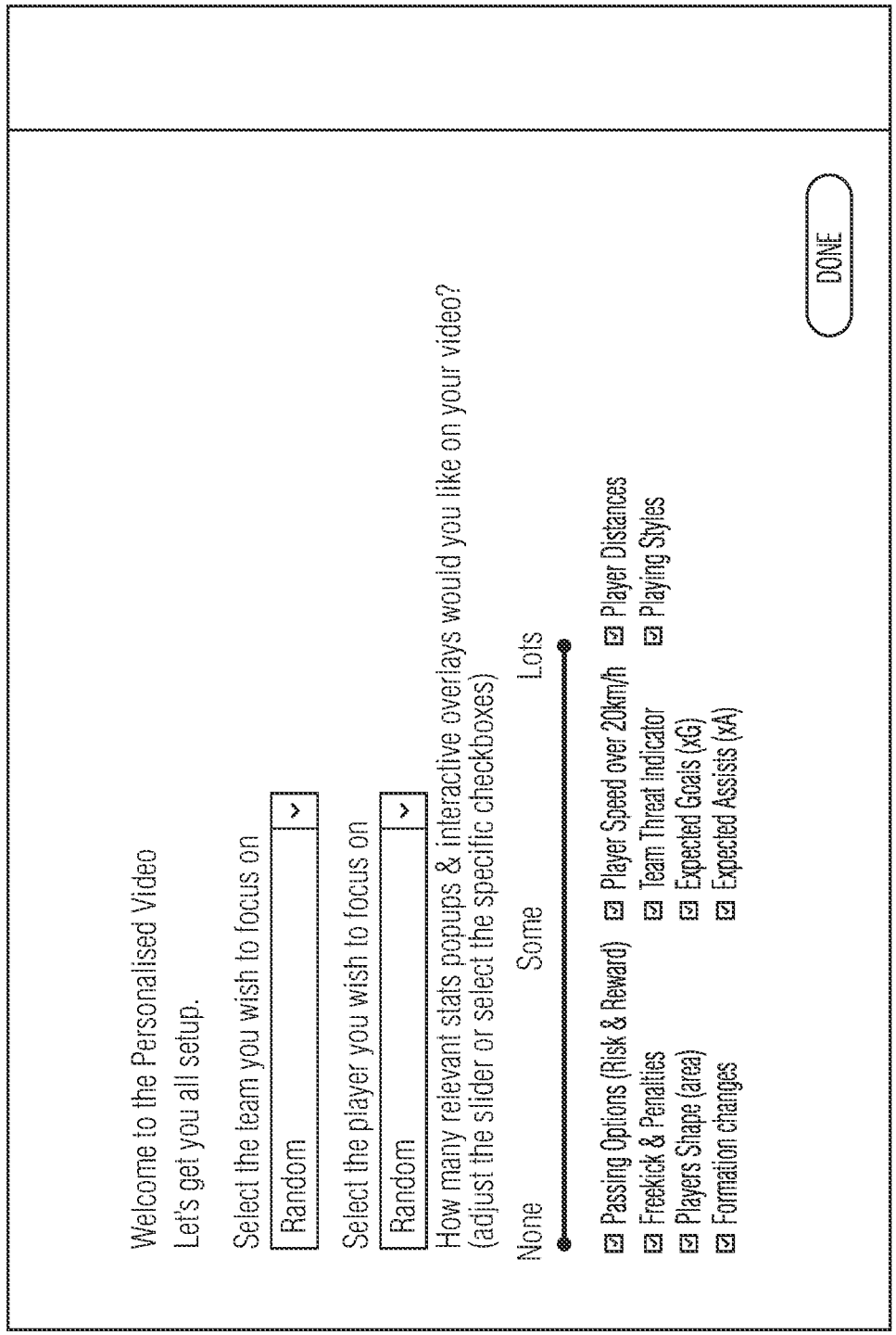
FIG. 5A illustrates a graphical user interface for interactive video, according to example embodiments.

FIG. 5A illustrates a graphical user interface (GUI) 500 that includes an interactive video frame, according to example embodiments. As shown, GUI 500 may be presented to a user via application 132 executing on client device 108. GUI 500 may allow a user to define what type of information the user may desire to see overlaid onto a video feed of a sporting event, prior to a start of the video. As shown, GUI 500 may include one or more graphical elements that allow a user to manipulate or select certain types of desired information. Via GUI 500, a user may select a team to focus on. For example, a user may define which team involved in a game the user is requesting overlaid information. Additionally, via GUI 500, a user may also select a certain player on a given team. For example, a user may specify that the user is interested in additional insights or statistics related to a specific player on a given team. In this manner, application 132 can ensure that each frame that involves the specified player includes data associated with that player overlaid onto the video feed.

In some embodiments, a user may also be able to specify the amount of interactive overlays to be included in the game feed. For example, as shown, GUI 500 may include a slider bar that allows a user to dictate the frequency or number of popups and interactive overlays the user would like to see in the game feed.

In some embodiments, a user may also be able to specify a type of interactive overlays to be presented in the video feed. For example, GUI 500 may include a plurality of selectable options such as, but not limited to, passing options, free kick and penalties, players shape (area), formation changes, player speed, team threat indicator, expected goals, expected assists, player distances, player styles, and the like.

Through GUI 500 a user can pre-select or pre-dictate both the type of interactive overlays and the frequency at which those interactive overlays are presented to the user during the game feed.

Figure 5B:
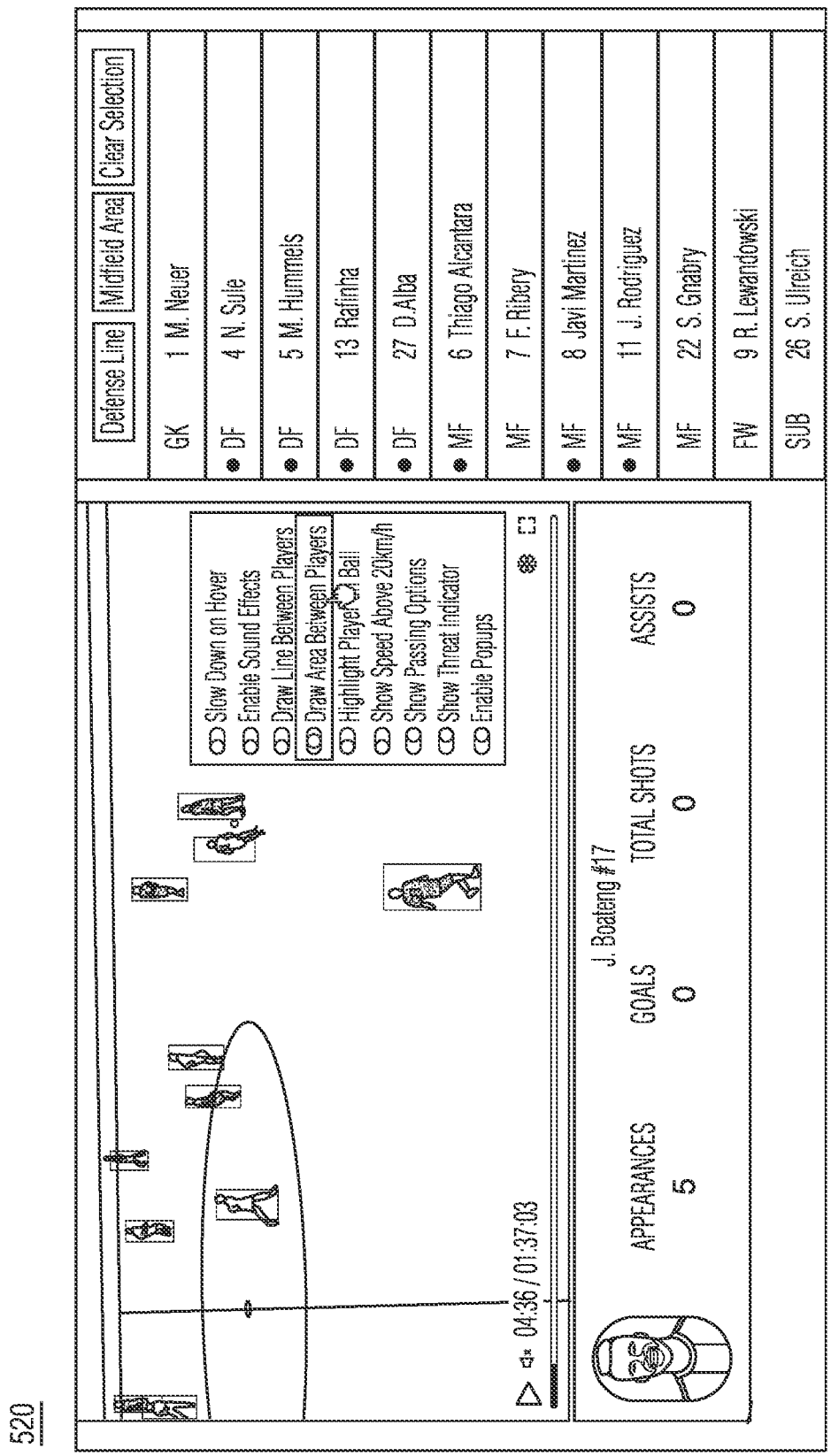
FIG. 5B illustrates a graphical user interface for interactive video, according to example embodiments.

FIG. 5B illustrates a graphical user interface (GUI) 520 that includes an interactive video frame, according to example embodiments. As shown, GUI 520 may be presented to a user via application 132 executing on client device 108. GUI 520 includes a video feed of a current game, as well as one or more overlay elements merged with the video feed of the current game. In addition to a user specifying certain overlay elements prior to initiation of the video feed, a user may also be able to request certain overlay elements during presentation of the video feed. For example, as illustrated, a user may be able to configure between drawing areas between players and omitting such overlay information from the video feed.

Figure 5C:
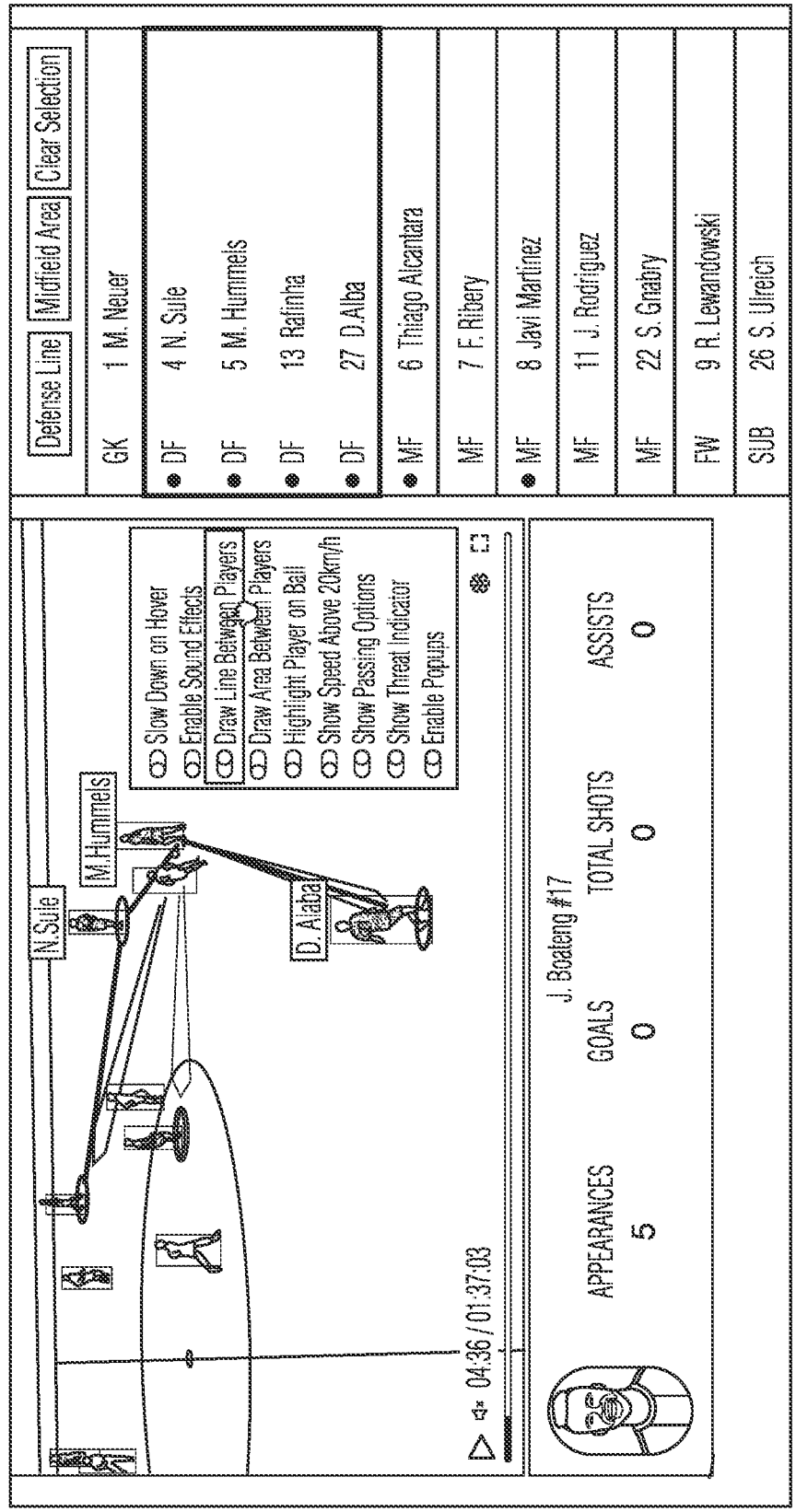
FIG. 5C illustrates a graphical user interface for interactive video, according to example embodiments.

FIG. 5C illustrates a graphical user interface (GUI) 540 that includes an interactive video frame, according to example embodiments. As shown, GUI 540 includes one or more overlay elements within the video feed of the game. As shown, the one or more overlay elements may include lines between players on the same team, arrows indicating a possible target for a pass, and player name information.

Figure 5D:
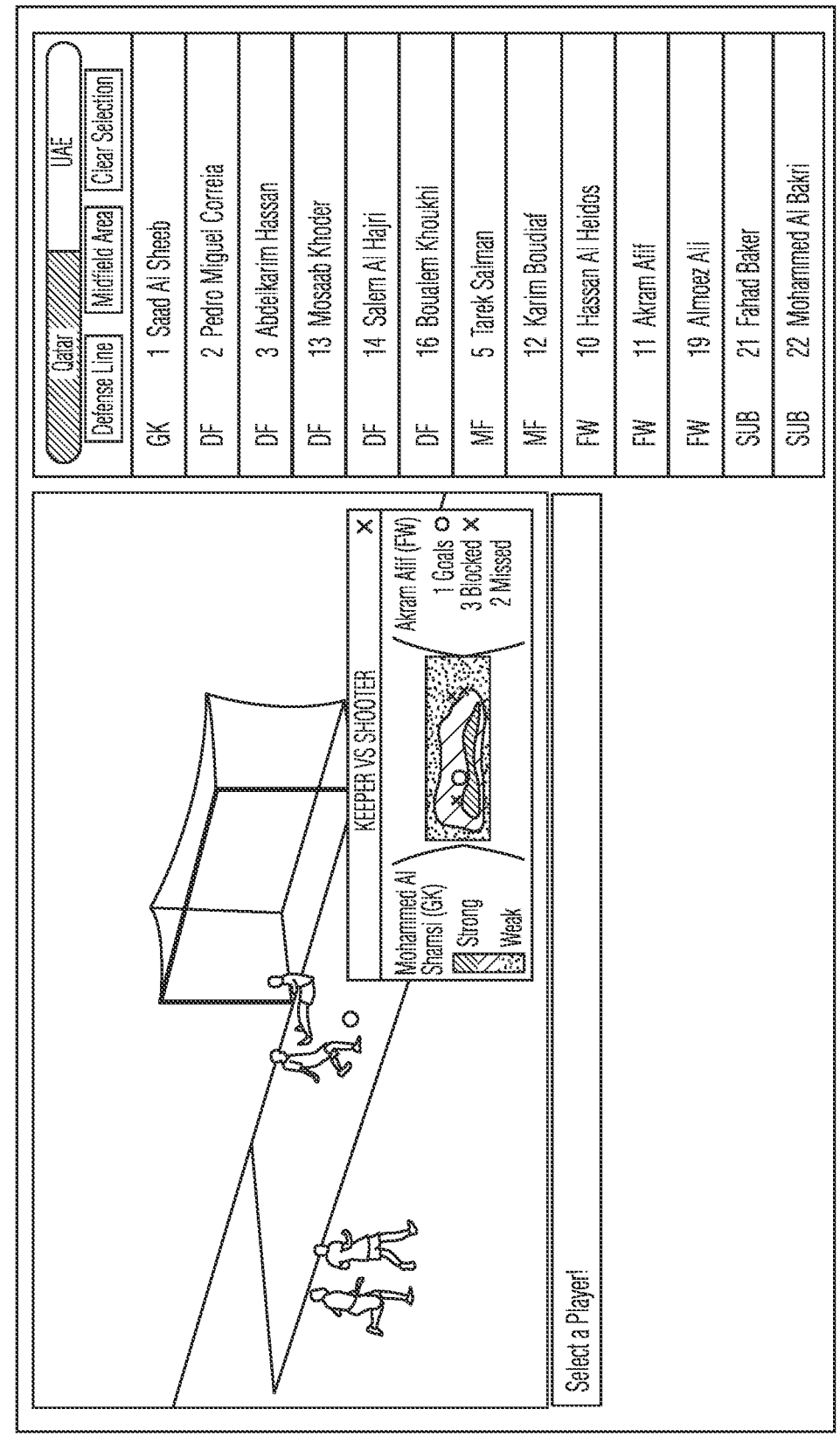
FIG. 5D illustrates a graphical user interface for interactive video, according to example embodiments.

FIG. 5D illustrates a graphical user interface (GUI) 560 that includes an interactive video frame, according to example embodiments. As shown, GUI 560 includes an overlay element within the video feed of the game. The overlay element may correspond to a prediction of a penalty shot between the shooter and the goalkeeper. The overlay element may be triggered by application 132 detecting a penalty shot event.

Figure 5E:
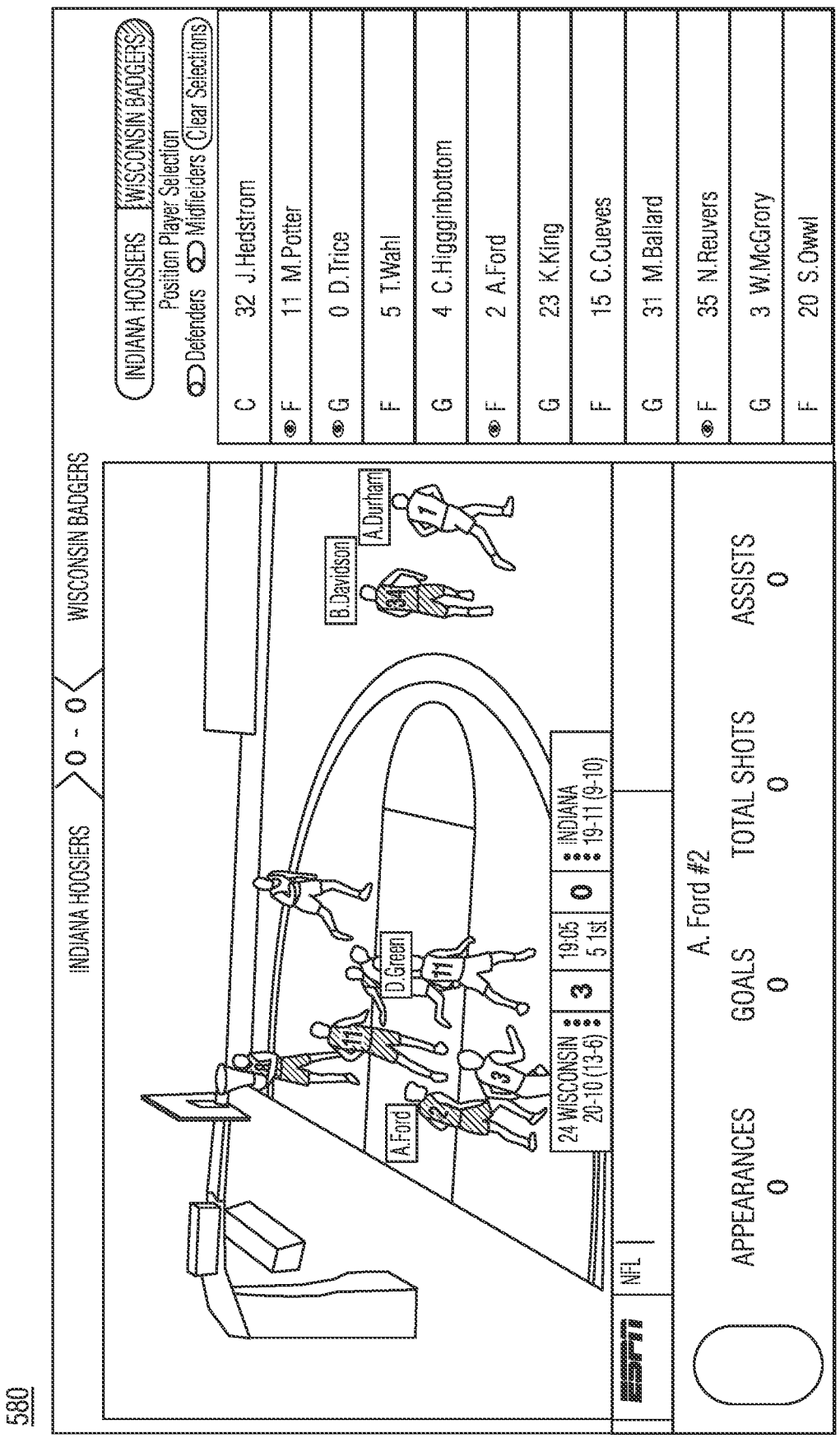
FIG. 5E illustrates a graphical user interface for interactive video, according to example embodiments.

FIG. 5E illustrates a graphical user interface (GUI) 580 that includes an interactive video frame, according to example embodiments. As shown, GUI 560 includes an overlay element within the video feed of the game. The overlay element may correspond to player labels associated with players currently on screen.

Figure 6:
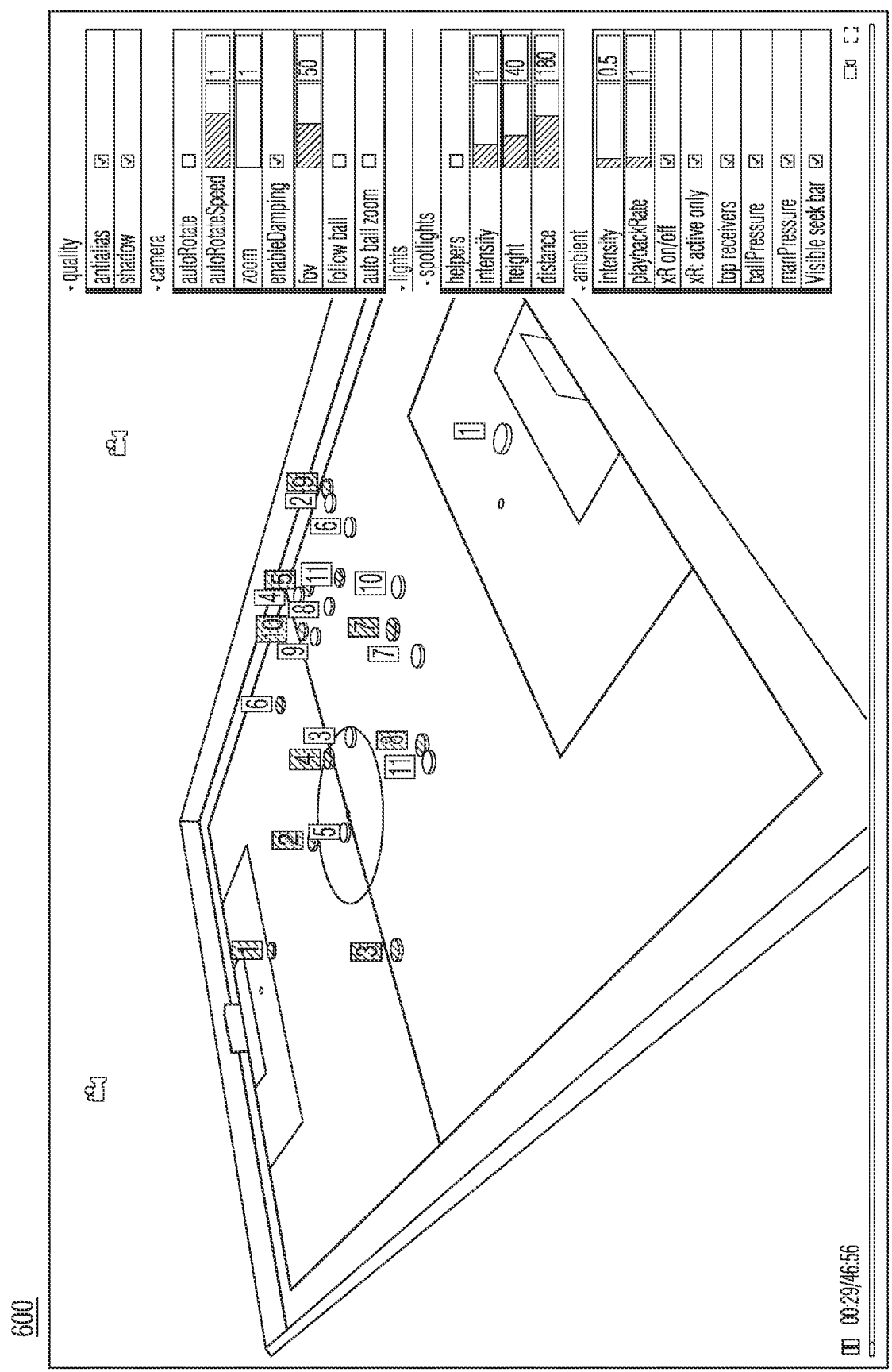
FIG. 6 illustrates a graphical user interface corresponding to a viewer that may be generated by interactive video agent, according to example embodiments.

FIG. 6 illustrates a graphical user interface (GUI) corresponding to a viewer 600 that may be generated by interactive video agent 116, according to example embodiments. As shown, viewer 600 may illustrate representations of players involved in a match.

In some embodiments, a user may be able to interactive with viewer 600. For example, a user may zoom in and out to get a more detailed view. In some embodiments, a user may select an automatic ball zoom setting, which automatically zooms into a location on the field where the ball is. In some embodiments, a user may select a fast replay option, which may provide the user with a replay of the match or event at a given replay rate (e.g., 50%, 200%, and the like). In some embodiments, the user may be able to navigate within the event or match.

In some embodiments, viewer 600 may allow a user to follow a player. For example, viewer 600 may include a camera option that puts the viewer in the shoes of their favorite player. In this manner, the user may see the whole game/scene from the viewpoint of the selected player.

In some embodiments, viewer 600 may allow for dynamic graphic insertion. For example, viewer 600 may present relevant contextualized graphics in the form of "broadcast graphics."

In some embodiments, viewer 600 may support advertisements. For example, viewer 600 may present an advertisement that may be actionable by the user (e.g., a banner advertisement). Viewer 600 may also integrate dynamic advertisement content throughout the game or match. The advertisements may be derived from an advertisement service using predictive artificial intelligence metrics and connected betting markets from a particular bookmaker.

FIG. 7A illustrates a system bus architecture of computing system 700, according to example embodiments. System 700 may be representative of at least a portion of organization computing system 104. One or more components of system 700 may be in electrical communication with each other using a bus 705. System 700 may include a processing unit (CPU or processor) 710 and a system bus 705 that couples various system components including the system memory 715, such as read only memory (ROM) 720 and random access memory (RAM) 725, to processor 710. System 700 may include a cache of high-speed memory connected directly with, in close proximity to, or integrated as part of processor 710. System 700 may copy data from memory 715 and/or storage device 730 to cache 712 for quick access by processor 710. In this way, cache 712 may provide a performance boost that avoids processor 710 delays while waiting for data. These and other modules may control or be configured to control processor 710 to perform various actions. Other system memory 715 may be available for use as well. Memory 715 may include multiple different types of memory with different performance characteristics. Processor 710 may include any general purpose processor and a hardware module or software module, such as service 1 732, service 2 734, and service 3 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction with the computing system 700, an input device 745 may represent any number of input mechanisms, such as a microphone for speech, a touch-sensitive screen for gesture or graphical input, keyboard, mouse, motion input, speech and so forth. An output device 735 (e.g., a display) may also be one or more of a number of output mechanisms known to those of skill in the art. In some instances, multimodal systems may enable a user to provide multiple types of input to communicate with computing system 700. Communications interface 740 may generally govern and manage the user input and system output. There is no restriction on operating on any particular hardware arrangement and therefore the basic features here may easily be substituted for improved hardware or firmware arrangements as they are developed.

Storage device 730 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 725, read only memory (ROM) 720, and hybrids thereof.

Storage device 730 may include services 732, 734, and 736 for controlling the processor 710. Other hardware or software modules are contemplated. Storage device 730 may be connected to system bus 705. In one aspect, a hardware module that performs a particular function may include the software component stored in a computer-readable medium in connection with the necessary hardware components, such as processor 710, bus 705, output device 735, and so forth, to carry out the function.

FIG. 7B illustrates a computer system 750 having a chipset architecture that may represent at least a portion of organization computing system 104. Computer system 750 may be an example of computer hardware, software, and firmware that may be used to implement the disclosed technology. System 750 may include a processor 755, representative of any number of physically and/or logically distinct resources capable of executing software, firmware, and hardware configured to perform identified computations. Processor 755 may communicate with a chipset 760 that may control input to and output from processor 755. In this example, chipset 760 outputs information to output 765, such as a display, and may read and write information to storage device 770, which may include magnetic media, and solid-state media, for example. Chipset 760 may also read data from and write data to RAM 775. A bridge 780 for interfacing with a variety of user interface components 785 may be provided for interfacing with chipset 760. Such user interface components 785 may include a keyboard, a microphone, touch detection and processing circuitry, a pointing device, such as a mouse, and so on. In general, inputs to system 750 may come from any of a variety of sources, machine generated and/or human generated.

Chipset 760 may also interface with one or more communication interfaces 790 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 755 analyzing data stored in storage device 770 or RAM 775. Further, the machine may receive inputs from a user through user interface components 785 and execute appropriate functions, such as browsing functions by interpreting these inputs using processor 755.

It may be appreciated that example systems 700 and 750 may have more than one processor 710 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method for delivering interactive video to a user, comprising:
    identifying, by a computing system, video contents corresponding to a sporting event, wherein the video contents comprise a plurality of video frames;
    annotating, by the computing system, each video frame of the plurality of video frames to uniquely identify a corresponding video frame and contents included within the corresponding video frame;
    receiving, by the computing system from a plurality of prediction models, a plurality of data inputs corresponding to one or more agents and one or more actions captured in each video frame of the plurality of video frames, wherein the plurality of data inputs includes a win probability at a moment in time represented by a respective video frame and at least one of: one or more sporting event statistics, team or squad data, sporting event data, a player location within at least one of the plurality of video frames, a player location on a two-dimensional playing surface within at least one of the plurality of video frames, player identification information, one or more sporting events linked to at least one of the plurality of video frames, player seasonal statistics, player career statistics, one or more sporting event facts and/or a live win probability;
    generating, by the computing system, a plurality of data frames based on the plurality of data inputs, wherein each data frame is uniquely associated with a respective video frame;
    mapping, by the computing system, each data frame with a respective video frame using the annotations;
    causing, by the computing system, a user device to present an interactive video to the user by instructing the user device to merge the plurality of data frames with the plurality of video frames;
    receiving, by the computing system, a request from the user device for overlay information corresponding to selecting at least one of one or more actors;
    generating, by the computing system, overlay information that includes actor data corresponding to the selected at least one of the one or more actors; and
    outputting, by the computing system, the overlay information to the user device with the interactive video.

2. The method of claim 1, wherein the plurality of video frames corresponds to live broadcast video data.

3. The method of claim 1, wherein annotating, by the computing system, each video frame of the plurality of video frames to uniquely identify the video frame and the contents included within the corresponding video frame comprises:
    tagging, by the computing system, each video frame with a unique identifier.

4. The method of claim 1, wherein generating, by the computing system, the plurality of data frames based on the plurality of data inputs comprises:
    identifying, by the computing system, a game context captured in a respective video frame; and
    associating, by the computing system, predictive analytics generated by the plurality of prediction models with a respective data frame based on the game context.

5. The method of claim 1, wherein generating, by the computing system, the plurality of data frames based on the plurality of data inputs comprises:
    identifying, by the computing system, each agent in each data frame.

6. The method of claim 1, wherein causing, by the computing system, the user device to present the interactive video to the user comprises:
    sending, by the computing system, the plurality of data frames and the plurality of video frames to the user device, wherein the user device merges the plurality of data frames with the plurality of video frames.

7. The method of claim 1, further comprising:
    generating, by the computing system, an interactive viewer comprising content retrieved from an in-venue data capture or a broadcast data capture; and
    presenting, by the computing system, the interactive viewer to an end user, wherein the end user can modify content within the interactive viewer.

8. The method of claim 7, wherein modifying the content within the interactive viewer comprises modifying one or more of: a camera angle, artificial intelligence generated metrics overlaying the content, speed of the content, target player within the content, and/or navigation to a portion of the content.

9. A system, comprising:
    a processor; and
    a memory having programming instructions stored thereon, which, when executed by the processor, causes the system to perform one or more operations, comprising:
        identifying video contents corresponding to a sporting event, wherein the video contents comprise a plurality of video frames;

annotating each video frame of the plurality of video frames to uniquely identify a corresponding video frame and contents included within the corresponding video frame;

receiving, from a plurality of prediction models, a plurality of data inputs corresponding to one or more agents and one or more actions captured in each video frame of the plurality of video frames, wherein the plurality of data inputs includes a win probability at a moment in time represented by a respective video frame and at least one of: one or more sporting event statistics, team or squad data, sporting event data, a player location within at least one of the plurality of video frames, a player location on a two-dimensional playing surface within at least one of the plurality of video frames, player identification information, one or more sporting events linked to at least one of the plurality of video frames, player seasonal statistics, player career statistics, one or more sporting event facts and/or a live win probability;

generating a plurality of data frames based on the plurality of data inputs, wherein each data frame is uniquely associated with a respective video frame;

mapping each data frame with a respective video frame using the annotations;

causing a user device to present an interactive video to the user by instructing the user device to merge the plurality of data frames with the plurality of video frames;

receiving a request from the user device for overlay information corresponding to selecting at least one of one or more actors;

generating overlay information that includes actor data corresponding to the selected at least one of the one or more actors; and outputting the overlay information to the user device with the interactive video.

10. The system of claim 9, wherein the plurality of video frames corresponds to live broadcast video data.

11. The system of claim 9, wherein annotating each video frame of the plurality of video frames to uniquely identify the video frame and the contents included within the corresponding video frame comprises:

tagging each video frame with a unique identifier.

12. The system of claim 9, wherein generating the plurality of data frames based on the plurality of data inputs comprises:

identifying game context captured in a respective video frame; and associating predictive analytics generated by the plurality of prediction models with a respective data frame based on the game context.

13. The system of claim 9, wherein generating the plurality of data frames based on the plurality of data inputs comprises:

identifying each agent in each data frame.

14. The system of claim 9, wherein causing the user device to present the interactive video to the user comprises:

sending the plurality of data frames and the plurality of video frames to the user device, wherein the user device merges the plurality of data frames with the plurality of video frames.

15. A non-transitory computer readable medium comprising one or more sequences of instructions, which, when executed by one or more processors, causes a computing system to perform operations, comprising:

identifying, by a computing system, video contents corresponding to a sporting event, wherein the video contents comprise a plurality of video frames;

annotating, by the computing system, each video frame of the plurality of video frames to uniquely identify a corresponding video frame and contents included within the corresponding video frame;

receiving, by the computing system from a plurality of prediction models, a plurality of data inputs corresponding to one or more agents and one or more actions captured in each video frame of the plurality of video frames, wherein the plurality of data inputs includes a win probability at a moment in time represented by a respective video frame and at least one of: one or more sporting event statistics, team or squad data, sporting event data, a player location within at least one of the plurality of video frames, a player location on a two-dimensional playing surface within at least one of the plurality of video frames, player identification information, one or more sporting events linked to at least one of the plurality of video frames, player seasonal statistics, player career statistics, one or more sporting event facts and/or a live win probability;

generating, by the computing system, a plurality of data frames based on the plurality of data inputs, wherein each data frame is uniquely associated with a respective video frame;

mapping, by the computing system, each data frame with a respective video frame using the annotations;

causing, by the computing system, a user device to present an interactive video to the user by instructing the user device to merge the plurality of data frames with the plurality of video frames;

receiving, by the computing system, a request from the user device for overlay information corresponding to selecting at least one of one or more actors;

generating, by the computing system, overlay information that includes actor data corresponding to the selected at least one of the one or more actors; and outputting, by the computing system, the overlay information to the user device with the interactive video.

16. The non-transitory computer readable medium of claim 15, wherein the plurality of video frames corresponds to live broadcast video data.

17. The non-transitory computer readable medium of claim 15, wherein annotating, by the computing system, each video frame of the plurality of video frames to uniquely identify the video frame and contents included within the corresponding video frame comprises:

tagging, by the computing system, each video frame with a unique identifier.

18. The non-transitory computer readable medium of claim 15, wherein generating, by the computing system, the plurality of data frames based on the plurality of data inputs comprises:

identifying, by the computing system, a game context captured in a respective video frame; and associating, by the computing system, predictive analytics generated by the plurality of prediction models with a respective data frame based on the game context.

* * * * *